RUSSEL P. HINDS, OF CHICAGO, ILLINOIS.

Letters Patent No. 85,308, dated December 29, 1868.

IMPROVED PAINT-COMPOSITION.

The Schedule referred to in these Letters Patent and making part of the same.

*To all whom it may concern:*

Be it known that I, RUSSEL P. HINDS, of Chicago, in the county of Cook, and State of Illinois, have invented a new and useful Improved Composition-Paint; and I do hereby declare the following to be a full, clear, and exact description of the same.

I take thirty (30) pounds of asphaltum, four (4) pounds of litharge, and six (6) pounds of gum-shellac, and, after heating them in a vessel, mix the compound with forty (40) gallons of hot residuum of coal-tar.

I then mix with that compound eight (8) pounds of rice or rice flour, boiled in water or light oil of coal-tar.

When this is well mixed, I add thereto fifteen (15) gallons of naphtha of coal-tar and ten (10) gallons of gasoline or naphtha of petroleum, but as they will not unite with the above compound by stirring, I add, for that purpose, six (6) pounds of unslaked lime, which causes the naphtha to unite with the other ingredients.

To the compound, thus formed, I add, for a body, twenty-five (25) pounds of china clay, after it is thoroughly pulverized.

The whole composition should be strained while warm.

My paint is a superior paint either for metal or wood.

What I claim as new, and desire to secure by Letters Patent, is—

1. The composition for paint, composed of the ingredients herein specified, or their equivalents, compounded substantially as herein described.

2. The application of unslaked lime, in connection with gasoline or naphtha, for the purpose of causing it to unite with other ingredients used to constitute a composition-paint.

RUSSEL P. HINDS.

Witnesses:
   L. L. COBURN,
   H. BRUNS.